United States Patent
Hirano et al.

(10) Patent No.: US 10,400,077 B2
(45) Date of Patent: Sep. 3, 2019

(54) REINFORCING FIBER FABRIC SUBSTRATE, PREFORM, AND FIBER-REINFORCED COMPOSITE MATERIAL

(71) Applicant: Toray Industries, Inc., Tokyo (JP)

(72) Inventors: Masanori Hirano, Nagoya (JP); Nobuyuki Tomioka, Nagoya (JP); Shiro Honda, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 151 days.

(21) Appl. No.: 15/037,596

(22) PCT Filed: Nov. 13, 2014

(86) PCT No.: PCT/JP2014/080011
§ 371 (c)(1),
(2) Date: May 18, 2016

(87) PCT Pub. No.: WO2015/079917
PCT Pub. Date: Jun. 4, 2015

(65) Prior Publication Data
US 2016/0289406 A1    Oct. 6, 2016

(30) Foreign Application Priority Data

Nov. 29, 2013 (JP) .................................. 2013-247203
Dec. 24, 2013 (JP) .................................. 2013-265056

(51) Int. Cl.
*C08J 5/24* (2006.01)
*C09D 163/00* (2006.01)
*D06M 15/55* (2006.01)

(52) U.S. Cl.
CPC .............. *C08J 5/24* (2013.01); *C09D 163/00* (2013.01); *D06M 15/55* (2013.01); *C08J 2363/00* (2013.01); *C08J 2363/02* (2013.01); *C08J 2363/04* (2013.01); *C08J 2463/02* (2013.01); *C08J 2463/04* (2013.01)

(58) Field of Classification Search
CPC ... D06M 15/55; C09D 163/00; C08J 2363/00; C08J 5/24; C08J 2463/04; C08J 2363/02; C08J 2463/02; C08L 63/00; C08L 2205/025; B32B 2305/076; B32B 2309/02; B32B 27/18; B32B 27/26; B32B 27/38; B32B 37/06; C08G 59/688; D01F 6/96; Y10T 156/10
USPC .............. 156/10; 427/486; 428/292.1, 297.4; 528/87
See application file for complete search history.

(56) References Cited

U.S. PATENT DOCUMENTS

| | | | |
|---|---|---|---|
| 5,369,192 A | 11/1994 | Ko et al. | |
| 10,053,575 B2 * | 8/2018 | Hirano | C08L 63/00 |

FOREIGN PATENT DOCUMENTS

| | | | |
|---|---|---|---|
| JP | 08-509921 A | | 10/1996 |
| JP | 2001-524171 A | | 11/2001 |
| JP | 2004-269705 A | | 9/2004 |
| JP | 2005-194456 | * | 1/2005 |
| JP | 2005-194456 A | | 7/2005 |
| JP | 2009-235175 A | | 10/2009 |
| JP | 2009-235182 A | | 10/2009 |
| JP | 2012-251044 A | | 12/2012 |
| WO | 2012/066805 A1 | | 5/2012 |
| WO | 2012/156523 | | 11/2012 |
| WO | 2014/007288 A1 | | 1/2014 |

OTHER PUBLICATIONS

Supplementary European Search Report dated Jun. 6, 2017, of corresponding European Application No. 14865021.1.

* cited by examiner

*Primary Examiner* — Camie S Thompson
(74) *Attorney, Agent, or Firm* — DLA Piper LLP (US)

(57) ABSTRACT

A reinforcing fiber fabric substrate has a binder containing a thermosetting resin [A] and a curing catalyst [B] at a basis weight of 0.1 g/m2-4 g/m2 on at least the surface of a reinforcing fiber fabric constructed of reinforcing fiber strands, wherein the reinforcing fiber fabric substrate has a heating temperature (T) in the 80-180° C. range, and the adhesive strength becomes 0.5 N/25 mm or higher at the heating temperature (T) between preform layers molded by laminating this reinforcing fiber fabric substrate at the heating temperature (T).

22 Claims, No Drawings

REINFORCING FIBER FABRIC SUBSTRATE, PREFORM, AND FIBER-REINFORCED COMPOSITE MATERIAL

TECHNICAL FIELD

This disclosure relates to a reinforcing fiber fabric base having a binder applied thereon, and a preform and a fiber-reinforced composite material each produced using the reinforcing fiber fabric base.

BACKGROUND

Applications of fiber-reinforced composite materials comprising reinforcing fibers and matrix resins have been spreading in various fields including sports and general industry, particularly aeronautics and space because they enable material designs that best exploit the advantages of reinforcing fibers and matrix resins.

As reinforcing fibers, glass fibers, aramid fibers, carbon fibers, boron fibers and the like are used. As a matrix resin, both a thermosetting resin and a thermoplastic resin can be used, though a thermosetting resin is more frequently used because of its ability of easy impregnation into reinforcing fibers. As a thermosetting resin, a resin composition can be used comprising an epoxy resin, an unsaturated polyester resin, a vinyl ester resin, a phenol resin, a bismaleimide resin, a cyanate resin or the like and a curing agent or a curing catalyst.

A fiber-reinforced composite material can be produced by various methods. Among the methods, an RTM (Resin Transfer Molding) method comprising injecting a liquid thermosetting resin (a matrix resin) into a reinforcing fiber base placed in a mold such as a metallic mold (a mold for use in the molding of a fiber-reinforced composite material is referred to as a molding mold, hereinbelow) and then curing the resultant product by heating to produce the fiber-reinforced composite material has been focused as a method having excellent low-cost productivity.

When a fiber-reinforced composite material is produced by an RTM method, the procedure is often carried out by first producing a preform obtained by processing a reinforcing fiber base into a shape that is almost the same as that of a desired product, placing the preform in a molding mold and then injecting a liquid matrix resin into the preform.

As the method of producing the preform, several methods are known, including a method in which a three-dimensional braid is produced from reinforcing fibers and a method in which reinforcing fiber fabrics are laminated and the resultant laminate is stitched. As a method having high general versatility, a method is known in which sheet-like bases such as reinforcing fiber fabrics are laminated with a hot-meltable binder (tackifier) and then the laminate is shaped using a mold for use in molding a preform (also referred to as a "preform mold," hereinbelow).

In the preform production method in which the preform is shaped with a binder, there is a tendency that subsequent impregnation of the reinforcing fiber bases with the injected liquid matrix resin is inhibited by the binder. Impregnability varies in accordance with the amount of the binder used, and superior impregnation with the matrix resin can be achieved with a smaller amount of binder. However, if the amount of binder is reduced, the bond strength between the sheet-like base layers in the preform is decreased and therefore the shape retainability of the preform becomes insufficient. In those situations, a binder-applied reinforcing fiber base which can have sufficient shape retainability even when the amount of the binder is reduced and can also have excellent liquid matrix resin impregnability is keenly demanded.

In Japanese Patent Laid-open Publication No. 2005-194456, a technique of using, as a binder, a resin composition comprising a thermoplastic resin and an epoxy resin and having excellent adhesion to reinforcing fibers is disclosed. When a preform is produced using the resin composition as a binder, bondability is poor because of the thermoplasticity of the binder, and the shape retainability of the preform becomes insufficient when the amount of the binder is reduced. Furthermore, in the production of the preform, it is needed to closely adhere the fabric bases to each other by increasing the temperature of the preform mold to temporarily melt the binder and then solidify the binder by cooling the preform mold.

In Japanese Unexamined Patent Application Publication (Translation of PCT Application) No. 8-509921, on the other hand, a resin composition for use as a binder is disclosed, which is a curing-reactive resin composition comprising a combination of an epoxy resin such as a liquid bisphenol A-type epoxy resin and a catalyst such as ethyltriphenylphosphonium acetate, and which is partially cured by heating to increase the detachment strength of the resultant preform. In that case, however, although it is demonstrated that the detachment strength is improved, the amount of the binder cannot be reduced satisfactorily. Furthermore, in that technique, the binder is in a softened state during heating of the preform. Therefore, it is still needed to cool the preform mold to remove the shape-retained preform from the preform mold.

In addition, as shown in Japanese Unexamined Patent Application Publication (Translation of PCT Application) No. 2001-524171, a resin composition for use as a binder is disclosed in which thermosettability is imparted to a mixture of a thermosetting resin and a thermoplastic resin. However, although a fiber-reinforced composite material produced by molding the resin composition has greatly improved interlayer toughness, the amount of the binder cannot be reduced satisfactorily. Furthermore, also in that technique, cooling is needed to remove the shape-retained preform.

In Japanese Patent Laid-open Publication No. 2012-251044, a reinforcing fiber base is disclosed in which reinforcing fibers are coated with an emulsion-type binder and therefore the amount of the binder can be reduced compared to when a powdery binder is used. However, the binder used in the reinforcing fiber base also has poor bondability because of the thermoplasticity thereof and therefore there is a limit to the reduction in the amount of the binder.

It could therefore be helpful to improve the disadvantages of the above-mentioned conventional techniques and provide: a resin composition for use as a binder that does not require an increase or decrease in the temperature of a preform mold, enables a reduction in the amount of a binder to be used while allowing a preform to keep the shape retainability at a satisfactory level, has excellent liquid matrix resin impregnability, and can provide a fiber-reinforced composite material having excellent designability; a reinforcing fiber fabric base; a preform; and a fiber-reinforced composite material.

SUMMARY

We thus provide reinforcing fiber fabric base comprising: a reinforcing fiber fabric composed of reinforcing fiber strands; and a binder comprising a thermosetting resin [A] and a curing catalyst [B] and is applied at least on the surface of the reinforcing fiber fabric at an area coating weight of 0.1 to 4 g/m², wherein the reinforcing fiber fabric base has such a property that a heating temperature T at which the bond strength between layers in a preform, which is produced by laminating the reinforcing fiber fabric bases and then molding the resultant laminate at the heating temperature T, becomes 0.5 N/25 mm or more is present within the range from 80 to 180° C.

The resin composition can be used as a binder to be contained in the reinforcing fiber fabric base; and the use of the resin composition is a use of a resin composition used as a binder to be contained in a reinforcing fiber fabric base, wherein the reinforcing fiber fabric base is the reinforcing fiber fabric base.

The preform is one produced by laminating multiple pieces of the reinforcing fiber fabric bases and then setting the shape of the resultant laminate.

The method of producing a preform comprises:
  laminating multiple pieces of reinforcing fiber fabric bases each of which comprises a reinforcing fiber fabric composed of reinforcing fiber strands and a binder comprising a thermosetting resin [A] and a curing catalyst [B] and applied at least on the surface of the reinforcing fiber fabric at an area coating weight of 0.1 to 4 g/m²; and
  heating the resultant laminate at a heating temperature T ranging from 80 to 180° C. for a heating time t ranging from 1 to 30 minutes to cure the binder such that the binder shows the lowest viscosity of 10 to 10,000 Pa·s and subsequently the viscosity of the binder increases to 10,000,000 Pa·s or more within the time t, thereby producing the preform.

Furthermore, the fiber-reinforced composite material is produced by impregnating the preform or a preform produced by the method with a liquid thermosetting resin and then curing the resultant product.

It is thus possible to produce a preform having satisfactory shape retainability using a reinforcing fiber fabric base containing a binder in a reduced amount without requiring the increase or decrease in the temperature of a preform mold, to achieve excellent liquid matrix resin impregnability, and to provide a fiber-reinforced composite material having improved designability.

DETAILED DESCRIPTION

Hereinbelow, preferred examples will be described.

The reinforcing fiber fabric base comprises: a reinforcing fiber fabric composed of reinforcing fiber strands; and a binder comprising a thermosetting resin [A] and a curing catalyst [B] and is applied at least on the surface of the reinforcing fiber fabric at an area coating weight of 0.1 to 4 g/m², wherein the reinforcing fiber fabric base has such a property that a heating temperature T at which the bond strength between layers in a preform produced by laminating the reinforcing fiber fabric bases and then molding the resultant laminate at the heating temperature T, becomes 0.5 N/25 mm or more is present at 80 to 180° C.

The binder comprises a resin composition comprising a combination of a thermosetting resin [A] and a curing catalyst [B] so that the curing reaction of the thermosetting resin [A] can proceed within a short time by the heating in the molding of a preform, and the toughness caused by curing contributes to excellent bondability of the binder to a reinforcing fiber fabric. Furthermore, because the glass transition temperature of the binder exceeds, by curing, a heating temperature employed in the molding of a preform, it becomes possible to remove the preform from a preform mold without cooling the preform mold. Hereinbelow, when the term "bondability" is used simply, it refers to the bondability of the binder to a reinforcing fiber fabric.

The thermosetting resin [A] is a resin material in which the curing reaction proceeds by heating to form a cross-linked structure. As the thermosetting resin [A], an epoxy resin, a phenolic resin, an unsaturated polyester resin, a vinyl ester resin, a bismaleimide resin, a cyanate resin, a benzoxazine resin or the like can be used.

It is preferred that the thermosetting resin [A] contains an epoxy resin among the above-mentioned resins from the viewpoint of bondability and handling easiness, and it is more preferred that the epoxy resin is the main component of the thermosetting resin [A]. The wording "the epoxy resin is the main component of the thermosetting resin [A]" refers to a matter that the epoxy resin makes up 60% by mass or more, more preferably 80% by mass or more, of the thermosetting resin [A].

The term "an epoxy resin" refers to a compound having at least two epoxy groups per molecule. The epoxy resin may comprise only a single compound having an epoxy group or may comprise a mixture of multiple types of such compounds.

Specific examples of the epoxy resin include: an epoxy resin having an epoxy group as a part of a glycidyl group such as an aromatic glycidyl ether produced from a phenol compound having multiple hydroxy groups, an aliphatic glycidyl ether produced from an alcohol compound having multiple hydroxy groups, a glycidylamine produced from an amine compound, and a glycidyl ester produced from a carboxylic acid compound having multiple carboxyl groups; and an epoxy resin produced by oxidizing an unsaturated alicyclic compound such as cyclohexene and contains an oxirane ring in the structure thereof.

The thermosetting resin [A] preferably contains a bifunctional epoxy resin because of its superior bondability among epoxy resins. The term "a bifunctional epoxy resin" refers to an epoxy resin having two epoxy groups per molecule. When the bifunctional epoxy resin is used, undue increase in the crosslinking density after the curing of the binder can be avoided and therefore excellent bondability can be achieved.

It is preferred that, among bifunctional epoxy resins, a solid bifunctional epoxy resin is contained, from the viewpoint of the achievement of an excellent balance among the curing reactivity, life, toughness and heat resistance of the binder and modulation of the flow of the binder. The term "a solid bifunctional epoxy resin" refers to an epoxy resin having a glass transition temperature of 20° C. or higher and therefore does not exhibit fluidability at ambient temperature and has two epoxy groups per molecule. The term "ambient temperature" as used herein refers 25° C. (the same applies hereinbelow).

The glass transition temperature is one determined by differential scanning calorimetry (DSC) in accordance with JIS K 7121:1987. An example of the measurement device which can be used for the above-mentioned standard is Pyris1 DSC (manufactured by Perkin Elmer Inc.). A sample whose glass transition temperature is to be measured is collected in an aluminum sample pan and the measurement is carried out in a nitrogen atmosphere at a temperature rising rate of 40° C./min. An intermediate point of the displacement of a region in which the base line is shifted to a heat-absorbing side in a DSC curve obtained by the above-mentioned measurement is employed as a glass transition temperature.

It is more preferred that a bifunctional bisphenol-type epoxy resin is used as the bifunctional epoxy resin from the viewpoint of the achievement of an excellent balance among the curing reactivity, life, toughness and heat resistance of the binder and the modulation of the flow of the binder. Examples of the bifunctional bisphenol-type epoxy resin include a bisphenol A-type epoxy resin, a bisphenol F-type epoxy resin, a bisphenol S-type epoxy resin, a bisphenol E-type epoxy resin and a bisphenol Z-type epoxy resin, and alkyl-substituted products, halogen-substituted products and hydrogenated products of the resins, but are not limited thereto. Among these resins, a bisphenol A-type epoxy resin can be suitably used because the resin can provide an excellent balance among the curing reactivity, life, toughness and heat resistance of the binder.

It is preferred that the thermosetting resin [A] also contains a polyfunctional epoxy resin in addition to the solid bifunctional epoxy resin.

When the solid bifunctional epoxy resin is combined with the polyfunctional epoxy resin, it becomes possible to increase the high-speed curability and heat resistance of the binder. By improving the heat resistance of the binder, it becomes possible to apply the binder to a preform heated in a high temperature range. The term "a polyfunctional epoxy resin" as used herein refers to an epoxy resin having more than two epoxy groups per molecule.

It is preferred that the thermosetting resin [A] contains a solid polyfunctional epoxy resin among the polyfunctional epoxy resins from the viewpoint of the achievement of an excellent balance among the curing reactivity, life and toughness of the binder and the modulation of the flow of the binder. The term "a solid polyfunctional epoxy resin" refers to an epoxy resin which has a glass transition temperature of 20° C. or higher and therefore does not exhibit fluidability at ambient temperature and having more than two epoxy groups per molecule.

The polyfunctional epoxy resins are roughly categorized into glycidylamine-type polyfunctional epoxy resins and non-glycidylamine-type polyfunctional epoxy resins.

Examples of the glycidylamine-type polyfunctional epoxy resin include tetraglycidyl diamino diphenylmethane, triglycidyl aminophenol, triglycidyl aminocresol and tetraglycidyl xylylene diamine, and structural isomers, halogen-substituted products and alkyl-substituted products of the compounds, and hydrogenated products of the compounds, the structural isomers, the halogen-substituted products and the alkyl-substituted products.

As commercially available products of tetraglycidyl diamino diphenylmethane, "Sumiepoxy" (registered trademark) ELM434 (manufactured by Sumitomo Chemical Co., Ltd.), YH434L (manufactured by NIPPON STEEL & SUMIKIN CHEMICAL CO., LTD.), "jER" (registered trademark) 604 (manufactured by Mitsubishi Chemical Corporation), "Araldite" (registered trademark) MY720 and "Araldite" (registered trademark) MY721 (manufactured by Huntsman Advanced Materials) and the like can be used.

As commercially available products of triglycidyl aminophenol or triglycidyl aminocresol, "Sumiepoxy" (registered trademark) ELM100 and "Sumiepoxy" (registered trademark) ELM120 (manufactured by Sumitomo Chemical Co., Ltd.), "Araldite" (registered trademark) MY0500, "Araldite" (registered trademark) MY0510 and "Araldite" (registered trademark) MY0600 (manufactured by Huntsman Advanced Materials), "jER" (registered trademark) 630 (manufactured by Mitsubishi Chemical Corporation) and the like can be used.

As commercially available products of tetraglycidyl xylylenediamine and a hydrogenated product thereof, "TETRAD" (registered trademark)—X and "TETRAD" (registered trademark)—C (manufactured by Mitsubishi Gas Chemical Company, Inc.) and the like can be used.

Examples of the non-glycidylamine-type polyfunctional epoxy resin include a phenol novolac-type epoxy resin, a cresol novolac-type epoxy resin, a triphenylmethane-type epoxy resin, a tetraphenylethane-type epoxy resin, a phenol aralkyl-type epoxy resin, a naphthol aralkyl-type epoxy resin, and an epoxy resin containing a dicyclopentadiene backbone.

Examples of the commercially available product of the phenol novolac-type epoxy resin include "jER" (registered trademark) 152 and 154 (manufactured by Mitsubishi Chemical Corporation), and "Epiclon" (registered trademark) N-740, N-770 and N-775 (manufactured by DIC Corporation).

Examples of the commercially available product of the cresol novolac-type epoxy resin include "Epiclon" (registered trademark) N-660, N-665, N-670, N-680 and N-695 (manufactured by DIC Corporation), EOCN-1020 and EOCN-102S (manufactured by Nippon Kayaku Co., Ltd.), and YDCN-700 and YDCN-701 (manufactured by Nippon Steel Chemical Co., Ltd.).

Examples of the commercially available product of the triphenylmethane-type epoxy resin include "Tactix" (registered trademark) 742 (manufactured by Huntsman Advanced Materials), and EPPN-501H and EPPN-502H (manufactured by Nippon Kayaku Co., Ltd.).

Examples of the commercially available product of the tetraphenylethane-type epoxy resin include "jER" (registered trademark) 1031 (manufactured by Mitsubishi Chemical Corporation), and GTR1800 (manufactured by Nippon Kayaku Co., Ltd.).

Examples of the commercially available product of the phenol aralkyl-type epoxy resin include NC2000 series (manufactured by Nippon Kayaku Co., Ltd.), NC7000 series (manufactured by Nippon Kayaku Co., Ltd.) and NC3000 series (manufactured by Nippon Kayaku Co., Ltd.).

Examples of the commercially available product of the naphthol aralkyl-type epoxy resin include NC7300 series (manufactured by Nippon Kayaku Co., Ltd.), ESN-165, ESN-175, ESN-185 and ESN-195 (manufactured by NIPPON STEEL & SUMIKIN CHEMICAL CO., LTD.) and NC3000 (manufactured by Nippon Kayaku Co., Ltd.).

Examples of the commercially available product of the epoxy resin containing a dicyclopentadiene backbone include "Epiclon" (registered trademark) HP-7200 series (manufactured by DIC Corporation) and XD-1000 series (manufactured by Nippon Kayaku Co., Ltd.).

As the thermosetting resin [A], a non-glycidylamine-type polyfunctional epoxy resin is preferably used among the polyfunctional epoxy resins from the viewpoint of the storage stability and toughness of the binder.

It is preferred that 100 parts by mass of the thermosetting resin [A] comprises 20 to 80 parts by mass of a solid bifunctional epoxy resin and 20 to 80 parts by mass of a polyfunctional epoxy resin from the viewpoint of the balance among heat resistance, curing rate and toughness of the binder.

If the content of the solid bifunctional epoxy resin is less than 20 parts by mass in 100 parts by mass of the thermosetting resin [A], the toughness of the binder after curing is likely to be insufficient, the glass transition temperature of the binder is likely to be insufficient and the storage stability of the binder is often deteriorated. If the content of the solid bifunctional epoxy resin is more than 80 parts by mass in 100 parts by mass of the thermosetting resin [A], it is likely that the heat resistance of the binder is insufficient and the demoldability in the molding of a preform in a higher heating temperature range is insufficient (in other words, demolding cannot be achieved without decreasing the temperature of a preform mold).

If the content of the polyfunctional epoxy resin is less than 20 parts by mass in 100 parts by mass of the thermosetting resin [A], it is likely that the heat resistance of the binder is insufficient, demoldability in the molding of a preform is insufficient, high-speed curability of the binder is deteriorated, and therefore productivity is decreased. If the content of the polyfunctional epoxy resin is more than 80 parts by mass in 100 parts by mass of the thermosetting resin [A], it is likely that the toughness of the binder is decreased and the bond strength is often insufficient.

The curing catalyst [B] is contained for the purpose of allowing the thermosetting resin [A] to rapidly and smoothly undergo the curing reaction by itself and the curing reaction through formation of a bond with a curing agent.

Specific examples of the curing catalyst [B] include organic phosphorous compounds and derivatives thereof, tertiary amine compounds and salts thereof, imidazole and derivatives thereof, quaternary ammonium salts, organic metal compounds, metal halides, and compounds each having a dimethylureido group.

Specific examples of the organic phosphorous compound include tributylphosphine, trioctylphosphine, tricyclohexylphosphine, triphenylphosphine, tribenzylphosphine, tri-o-tolylphosphine, tri-m-tolylphosphine, diphenylcyclohexylphosphine and 1,3-bis(diphenylphosphino)propane.

Specific examples of the tertiary amine compound and the salt thereof include triethylamine, dimethylbenzylamine, 2,4,6-tris(dimethylaminomethyl)phenol, 1,5-diazabicyclo[4.3.0]non-5-ene, 1,8-diazabicyclo[5.4.0]undec-7-ene, a phenol salt of 1,8-diazabicyclo[5.4.0]undec-7-ene, a phthalic acid salt of 1,8-diazabicyclo[5.4.0]undec-7-ene, pyridine, 4-dimethylaminopyridine, 3-dimethylaminopropylamine, 3-diethylaminopropylamine, 3-dibutylaminopropylamine, 2-diethylaminoethylamine, 1-diethylamino-4-aminopentane, N-(3-aminopropyl)-N-methylpropanediamine, 1-(2-aminoethyl)piperazine, 1,4-bis(2-aminoethyl)piperazine, 3-(3-dimethylaminopropyl)propylamine, 1,4-bis(3-aminopropyl)piperazine, 4-(2-aminoethyl)morpholine and 4-(3-aminopropyl)morpholine.

Specific examples of imidazole and the derivative thereof include imidazole, 2-ethylimidazole, 2-undecylimidazole, 2-heptadecylimidazole, 1,2-dimethylimidazole, 2-ethyl-4-methylimidazole, 1-benzyl-2-phenylimidazole, 1-benzyl-2-methylimidazole, 1-cyanoethyl-2-methylimidazole, and an adduct of imidazole to an epoxy compound.

Specific examples of the quaternary ammonium salt include tetraethylammonium bromide and tetrabutylammonium bromide.

Specific examples of the organic metal compound include zinc octylate, tin octylate, and an aluminum-acetylacetone complex.

Specific examples of the metal halide include a boron compound such as boron trifluoride and triphenyl borate, zinc chloride and tin (IV) chloride.

Specific examples of the compound having a dimethylureido group include: an aliphatic dimethylurea such as dimethylurea produced from isophorone diisocyanate and dimethylamine, dimethylurea produced from m-xylylene diisocyanate and dimethylamine, and dimethylurea produced from hexamethylene diisocyanate and dimethylamine; and an aromatic dimethylurea such as 3-(3,4-dichlorophenyl)-1,1-dimethylurea, 3-phenyl-1,1-dimethylurea, 4,4'-methylenebis(phenyldimethylurea), 2,4-tolylenebis(1,1-dimethylurea), 3-(4-chlorophenyl)-1,1-dimethylurea and 1,1-dimethyl-3-[3-(trifluoromethyl)phenyl]urea.

As the curing catalyst [B], at least one curing catalyst selected from an organic phosphorous compound, imidazole and a derivative of any one of the compounds can be used preferably from the viewpoint of the handling easiness and high-speed curability of the binder in a heating temperature range.

The curing catalyst [B] is preferably contained in an amount of 2 to 20 parts by mass relative to 100 parts by mass of the thermosetting resin [A]. If the content of the curing catalyst [B] relative to 100 parts by mass of the thermosetting resin is less than 2 parts by mass, the curing reactivity of the binder becomes poor and therefore it takes a while before sufficient bond strength is achieved, often resulting in the deterioration in productivity. If the content of the curing catalyst [B] relative to 100 parts by mass of the thermosetting resin [A] is more than 20 parts by mass, the curing reactivity of the binder becomes too high, often resulting in the deterioration in handling easiness.

The binder may contain a curing agent. The curing agent is a component which can bind to the thermosetting resin to form a three-dimensional network structure, thereby curing the resin. When an epoxy resin is used, the curing agent is a compound having an active group capable of reacting with an epoxy group in the epoxy resin. Such curing agents are roughly categorized into amine-type curing agents, phenol-type curing agents, acid anhydride-type curing agents, and mercaptan-type curing agents. Specific examples of the amine-type curing agent include dicyandiamide, an aromatic polyamine, an aliphatic amine, an aminobenzoic acid ester, a thiourea-added amine and a hydrazide; specific examples of the phenol-type curing agent include bisphenol, a phenol novolac resin, a cresol novolac resin and a polyphenol compound; specific examples of the acid anhydride-type curing agent include phthalic anhydride, maleic anhydride, succinic anhydride and a carboxylic acid anhydride; and specific examples of the mercaptan-type curing agent include polymercaptan and a polysulfide resin.

From the viewpoint of the achievement of both the storage stability of the binder at a temperature around ambient temperature and the curing reactivity of the binder at a molding temperature during the molding of a preform, an example in which a thermally latent curing catalyst and a thermally latent curing agent are used as the curing catalyst and the curing agent, respectively, is preferred. Each of the thermally latent curing catalysts and the thermally latent curing agents are roughly categorized into: solid-dispersed thermosetting type of thermally latent curing catalysts and thermally latent curing agents which have low solubility in an epoxy resin at a temperature around ambient temperature; and reactive group-blocked type of thermally latent curing catalysts and thermally latent curing agents in each of which a highly reactive functional group is blocked with a poorly reactive functional group. Examples of the solid-dispersed thermosetting type of thermally latent curing catalyst or curing agent include an aliphatic amine, an aromatic amine, a modified amine, a dihydrazide compound, an amine adduct, and 2-phenyl-4-methyl-5-hydroxy methylimidazole, and examples of the reactive group-blocked type of thermally latent curing catalyst or curing agent include an onium salt, a boron halide-amine complex, and a vinyl ether blocked carboxylic acid. As the thermally latent curing catalyst or curing agent, a microcapsule-type curing catalyst or curing agent in which the surface of imidazole, an organic phosphorous compound or the like is coated with a polymer can also be used.

The binder may contain a thermoplastic resin for the purpose of controlling the flow of the binder during the molding of the preform or improving the bond strength of the binder in association with the improvement in the toughness of the binder.

Specific examples of the thermoplastic resin include a polyamide, a polycarbonate, a polyacetal, a polyphenylene oxide, a polyphenylene sulfide, a polyarylate, a polyester, a polyamide imide, a polyimide, a polyether imide, a polyimide having a phenyltrimethylindan structure, a polysulfone, a polyether sulfone, a polyether ketone, a polyether ether ketone, a polyaramid, a polyether nitrile, a polybenzimidazole, a polyurethane, a urea resin, a polyvinyl acetal, a polyvinyl formal, a polyvinyl alcohol and a phenoxy resin.

Among these thermoplastic resins, a polyvinyl alcohol and a phenoxy resin each of which has a hydroxy group in the main chain thereof can be used suitably as the thermoplastic resin. When the thermoplastic resin has a hydroxy group in the main chain thereof, the bond strength of the binder to the reinforcing fiber fabric can be improved and an effect of accelerating the curing reaction of the epoxy resin can be often achieved.

In addition to the thermoplastic resin, into the binder, a filler component such as an elastomer or particles may also be blended for the purpose of controlling the flow of the binder during the molding, imparting bond strength and dimensional stability of the binder and the like. Particularly, rubber particles or organic particles which are soluble in the epoxy resin, an inorganic filler or the like can be blended suitably.

The binder preferably has a glass transition temperature of 40 to 80° C.

If the glass transition temperature is lower than 40° C., the viscosity becomes too low during molding and therefore the flow of the binder increases, resulting in insufficient bonding. Furthermore, the storage stability of the binder is often deteriorated. If the glass transition temperature is higher than 80° C., a high temperature is required for the melting of the binder and, therefore, the bond strength of the binder is often insufficient or the demoldability of the binder from the preform mold is often insufficient.

The binder preferably has such a property that, when the binder is heated at a heating temperature T of 80 to 180° C. for a heating time t of 1 to 30 minutes, there is such a combination of the heating temperature T and the heating time t that curing of the binder proceeds such that the binder exhibits a lowest viscosity of 10 to 10,000 Pa·s and subsequently the viscosity of the binder increases to 10,000,000 Pa·s or more within the time t. It is more preferred that, when the binder is heated under the same conditions, there is such a combination of the heating temperature T and the heating time t that the curing of the binder proceeds such that the binder exhibits a lowest viscosity of 100 to 5,000 Pa·s and subsequently the viscosity of the binder increases to 10,000,000 Pa·s or more within the time t.

The heating temperature T is preset when taking the preform molding temperature into consideration, and is a temperature at which the binder is cured and solidified. The heating temperature T is preferably 80 to 180° C., more preferably 90 to 130° C. from the viewpoint of the curability and bond strength of the binder. When the heating temperature T can be preset only within a temperature lower than 80° C., the binder has such a property that the preform molding temperature can be preset only within a temperature range lower than 80° C. In this case, curing reactivity of the binder is increased at ambient temperature and handling easiness of the binder becomes often poor. When the heating temperature T can be present only within a temperature range higher than 180° C., the binder has such a property that the preform molding temperature can be present only within a temperature range higher than 180° C. In this case, the crosslinking density in a curing reaction product of the binder becomes high and therefore the bond strength of the binder is deteriorated.

The heating time t is preset taking the preform molding time into consideration, and is a time required for the curing reaction of the binder to solidify the binder. The heating time t is preferably 1 to 30 minutes, more preferably 1 to 20 minutes. When the heating time t can be present only within a range shorter than 1 minute, the binder has such a property that the preform molding time can be present only within a range shorter than 1 minute. In this case, the binder is cured immediately after the heating and, therefore, it is often difficult to allow the reinforcing fiber fabric base to fully follow the shape of the preform mold. When the heating time t can be present only within a range longer than 30 minutes, the binder has such a property that the time of heating during preform molding can be present only within a range longer than 30 minutes. In this case, the time required for the molding of the preform is prolonged and therefore productivity is decreased.

When the binder has a lowest viscosity of 10 to 10,000 Pa·s under the above-mentioned heating conditions, the binder can be in a wet state suitable for the reinforcing fiber fabric. Therefore this requirement is effective to improve the bond strength of the preform. If the lowest viscosity is lower than 10 Pa·s, the melted binder is excessively penetrated into the reinforcing fiber fabric and the bond strength of the binder often becomes insufficient. If the lowest viscosity is higher than 10,000 Pa·s, the wet state of the binder for the reinforcing fiber fabric becomes insufficient and therefore the bond strength often becomes insufficient.

Curing the binder proceeds to such an extent that the binder has a viscosity of 10,000,000 Pa·s or more under the above-mentioned heating conditions means that the binder is cured and is in a glassy state. When the binder is in a glassy state, it becomes possible to remove the preform from the preform mold that has been heated to a predetermined temperature while the shape of the preform is kept.

The term "a viscosity" as used herein refers to a complex viscosity η* which is measured using a thermosetting measurement device (e.g., ATD-1000 manufactured by Alpha Technologies Inc. Ltd.) while keeping the heating temperature T constantly at a temperature falling within the range of 80 to 180° C.

The binder preferably has such a property that the curing reaction of the binder hardly proceeds in the process prior to the molding of the preform. In other words, the binder preferably has high thermal stability. If the curing reaction excessively proceeds in the process prior to the molding of the preform, the binder is not melted sufficiently during the molding of the preform and, therefore, the bond strength between layers in the resultant preform is often deteriorated.

The binder may be subjected to a preparatory reaction so that the binder can partly contain a preparatory reaction product of the thermosetting resin. In this manner, the glass transition temperature of the binder can be increased. The wording "the binder is subjected to a preparatory reaction" as used herein refers to the fact that a part of the curing reaction of the thermosetting resin in the binder is allowed to proceed. In this manner, the glass transition temperature of the binder is increased and the storage stability of the binder is often improved. Furthermore, the flow of the binder upon the heating during the preform molding is prevented by the preparatory reaction and therefore the bond strength and quality of the binder are often improved. The preparatory reaction of the binder may be carried out during preparation of the resin or subsequent to spraying the binder onto the reinforcing fiber fabric.

The binder is used such that the binder is attached at least on the surface of the reinforcing fiber fabric composed of reinforcing fiber strands. It is required that the amount of the binder to be attached onto one surface or both surfaces is an area coating weight of 0.1 to 4 g/m², preferably 0.5 to 3 g/m², per one layer of the reinforcing fiber fabric. If the amount is less than an area coating weight of 0.1 g/m², the shape retainability of the preform becomes poor. If the amount is more than an area coating weight of 4 g/m², impregnability of the matrix resin becomes poor and therefore the mechanical properties and productivity of the molded fiber-reinforced composite material are often deteriorated.

The shape of the binder is not particularly limited, and may have a form of a film, a tape, long fibers, short fibers, a spun yarn, a woven fabric, a knitted fabric, a non-woven fabric, a net-like material, particles and the like. Among these forms, a particulate form is particularly preferable. The binder having a particulate form sometimes refers to "binder particles," hereinbelow.

When a binder having a particulate form is used as the binder, the average particle diameter thereof is preferably 50 to 300 μm, more preferably 80 to 200 μm. The term "an average particle diameter" as used herein refers to a volume average particle diameter, and the average particle diameter of the binder particles can be determined using, for example, a laser diffraction-type particle size analyzer. If the average particle diameter is smaller than 50 μm, the melted binder resin excessively penetrates into the fiber and therefore the bond strength of the binder often becomes insufficient. If the average particle diameter is larger than 300 μm, the bonding area during the formation of the preform is decreased and therefore the bond strength of the binder becomes insufficient, or a problem that the reinforcing fiber is weaved and therefore the mechanical properties and designability of the fiber-reinforced composite material often occurs.

It is preferred that the binder particles have a particle diameter distribution index of 1 to 1.8, more preferably 1 to 1.5. If the particle diameter distribution index is more than 1.8, the particle diameter distribution becomes broad and therefore smaller particles among the binder particles present on the surface of the reinforcing fiber fabric base cannot contribute to adhesion. Consequently, there is a tendency that the bond strength becomes insufficient.

The particle diameter distribution index can be determined from the values of the particle diameters in accordance with the following numerical value conversion formulae.

$$Dn = \sum_{i=1}^{n} Di/n$$

$$Dv = \sum_{i=1}^{n} Di^4 \bigg/ \sum_{i=1}^{n} Di^3$$

$$PDI = Dv/Dn$$

In the formulae, Di represents a particle diameter of each particle; n represents 100 which is the number of particles measured; Dn represents a number average particle diameter; Dv represents a volume average particle diameter; and PDI represents a particle diameter distribution index.

The reinforcing fiber fabric is composed of reinforcing fiber strands. As the reinforcing fiber strands, strands of carbon fibers, glass fibers, aramid fibers, metal fiber and the like or a combination of two or more of these fibers can be used. Among these strands, carbon fiber strands can be used suitably because they are excellent in lightness and strength.

In general, reinforcing fibers are grouped into short fibers and continuous fibers. Continuous fibers are used for the purpose of producing a fiber-reinforced composite material having a high volume fraction (also referred to as "a high Vf," hereinbelow).

In general, the reinforcing fiber base include products produced by processing reinforcing fibers into a mat, a woven fabric, a knitted fabric, a braid, a uni-direction sheet and the like. A reinforcing fiber fabric composed of reinforcing fiber strands is used because a fiber-reinforced composite material having a high Vf is produced readily and the handing easiness of the fabric is excellent.

The number n of filaments in the reinforcing fiber strands that constitute the reinforcing fiber fabric and the area fiber density W[g/m²] of the reinforcing fiber fabric preferably satisfy Formula (1), more preferably Formula (2):

$$0 \le W - 0.011n \le 160 \quad (1)$$

$$0 \le W - 0.011n \le 140 \quad (2).$$

The number of filaments in the reinforcing fiber strands constituting the reinforcing fiber fabric relates to the number of crossing points in the reinforcing fiber fabric. If the number of filaments in the strands is small, the number of crossing points tends to be increased, often resulting in the deterioration in impregnability of a liquid matrix resin or the deterioration in mechanical properties of the fiber-reinforced composite material.

The term "an area fiber density of the reinforcing fiber fabric" refers to a mass [g] per 1 m² of the reinforcing fiber fabric. If the area fiber density is too small, the mechanical properties of the molded fiber-reinforced composite material are often deteriorated.

The requirement represented by Formula (1) is a requirement relating to the flattened level of the strands expressed by the relationship between the number n of filaments in the strands constituting the reinforcing fiber fabric and the area fiber density W[g/m²] of the reinforcing fiber fabric. The flattened level of the reinforcing fiber fabric increases with the increase in the number of filaments in the strands and the decrease in the area fiber density.

In the combination of the number n of filaments in the strands which constitute the reinforcing fiber fabric and the area fiber density W[g/m²] of the reinforcing fiber fabric, if the value of W−0.011n in Formula (1) is greater than 160, in other words, if the flattened level of the strands is insufficient, the number of crossing points in the reinforcing fiber fabric tends to increase, and when the binder has a particulate form, the binder particles tend to be concentrated at the crossing points. Therefore, the bond strength between layers in the preform is often deteriorated and the mechanical properties of the resultant fiber-reinforced composite material tend to be deteriorated. If the value of W−0.011n in Formula (1) is smaller than 0, in other words, if the flattened level of the strands is too much, it is likely that the reinforcing fiber fabric is not handled easily.

As the woven structure in the reinforcing fiber fabric, a plane weave, a satin weave, a twill weave, a non-crimp cloth and the like can be selected appropriately. When it is intended to expose a weave texture on an aesthetic surface by clear coating, a plane weave and a twill weave can be employed for improving designability. A woven fabric having a satin or twill weave structure has good drape properties and therefore can be used suitably to form a three-dimensional shape having a large depth dimension.

The ratio of the net reinforcing fiber volume of a reinforcing fiber fabric to its apparent volume is defined as the fiber packing ratio of the fabric. The fiber packing ratio of a fabric can be determined from an area fiber density W (unit: g/m²) of the reinforcing fiber fabric, a thickness t (unit: mm) of the reinforcing fiber fabric, and a density $\rho f$ (unit: g/cm³) of the reinforcing fibers in accordance with the formula: W/(1000t·$\rho f$). The area fiber density and the thickness of a fabric can be determined in accordance with JIS R 7602: 1995. The higher the fiber packing ratio of the fabric, the easier it is to get a high-Vf fiber-reinforced composite material. Therefore, the fiber packing ratio of the fabric is 0.10 to 0.85, preferably 0.40 to 0.85, more preferably 0.50 to 0.85.

The reinforcing fiber fabric base is required to have such a property that a heating temperature T at which the bond strength between layers in a preform produced by laminating the reinforcing fiber fabric bases and then molding the resultant laminate at the heating temperature T, becomes 0.5 N/25 mm or more is present at 80 to 180° C.

As mentioned above, the heating temperature T is preset when taking a temperature at which the preform is to be molded into consideration, and is a temperature at which the binder is to be cured and solidified. It is needed that the bond strength between layers in the preform becomes 0.5 N/25 mm or more at any heating temperature T to 80 to 180° C.

If the bond strength between layers in the preform at a heating temperature T during the preform molding is smaller than 0.5 N/25 mm, layers in the preform are likely to be delaminated upon the removal of the preform from the preform mold which has been heated to the heating temperature T for the purpose of molding the preform at a constant temperature, and the shape retainability of the preform is often insufficient. If the bond strength between layers in the preform is more than 5 N/25 mm and therefore is too high, impregnability of the matrix resin into between the layers is often decreased.

The bond strength between layers in the preform can be measured as follows. Two pieces of the reinforcing fiber fabric bases each having the binder at least on the surface thereof are laminated such that the directions of the front side and the back side of one of the bases become the same as those of the other, and then the resultant laminate is heated at any heating temperature from 80 to 180° C. while applying a pressure of 50 kPa for a time required to cure of the binder (30 minutes is employed when the time exceeds 30 minutes), thereby producing a preform for evaluation use. The time required to cure of the binder can be determined by separately measuring the binder by the above-mentioned viscosity measurement method. A test specimen is prepared by cutting the above-produced preform for evaluation use into a piece having a length of 150 mm (wherein a part positioned 100 mm from one end is bonded and a part positioned 50 mm from the other end is not bonded) and a width of 25 mm. The test on the delamination between the reinforcing fiber fabric base layers was carried out using the test specimen in accordance with JIS K 6854:1977 to determine bond strength.

If the bond strength at a heating temperature of 80 to 180° C. is not within a predetermined range, the measurement is carried out in the same manner except that another heating temperature of 80 to 180° C. is employed. In this manner, it becomes possible to confirm whether or not a heating temperature at which the bond strength is within the predetermined range is present at 80 to 180° C.

It is also preferred that the bond strength obtained when the area coating weight of the binder is 1 g/m² is 60% or more of that obtained when the area coating weight of the binder is 4 g/m².

In general, there is a tendency that the bond strength between layers in the preform varies in proportion to the area coating weight of the binder. This is because the delamination of layers in the preform is caused by the disruption of the binder that bonds the layers to each other.

In the reinforcing fiber fabric base in which the binder is applied on the surface thereof, the binder present between layers in the preform is hardly disrupted because the binder is cured and becomes highly tough during the molding of the preform. However, in the reinforcing fiber fabric base, delamination of layers in the preform is sometimes caused by slippage of fibers in the reinforcing fiber fabric base. In this case, since the influence of the area coating weight of the binder is small, a decrease in bond strength between layers in the preform can be minimized even when the area coating weight of the binder is reduced.

If the bond strength obtained when the area coating weight of the binder is 1 g/m² is less than 60% of that obtained when the area coating weight of the binder is 4 g/m², when the area coating weight of the binder is small, unevenness in the area coating weight of the binder may occur on the surface of the reinforcing fiber fabric base. As the result, a region having insufficient bond strength between layers in the molded preform is often formed and therefore the shape of the preform cannot be retained.

The above-mentioned resin composition used as the binder contained in the reinforcing fiber fabric base greatly contributes to the development of the desired effect.

The preform can be produced by laminating multiple pieces of the above-mentioned reinforcing fiber fabric bases and setting the shape of the resultant laminate. Each of the reinforcing fiber fabric bases has the binder applied at least on one surface thereof. The multiple reinforcing fiber fabric bases are laminated such that the binder is present at least between the layers to produce a laminate. The binder is melted temporarily by heating the laminate to bond the reinforcing fiber fabric bases together, and subsequently the binder is cured to fix the bases to each other. In this manner, the shape of the laminate is set to produce a preform having the binder at least between the layers in the laminate. In general, the preform can be produced by cutting the reinforcing fiber fabric bases into a desired shape, laminating the reinforcing fiber fabric bases on a preform mold and then applying proper amounts of heat and pressure to the laminate. As the means of applying a pressure, a pressing tool may be used or, alternatively, a method in which the laminate is enclosed by a vacuum bag film and then the inside of the vacuum bag film is sucked with a vacuum pump to pressurize the laminate with the atmospheric pressure may be employed.

Hereinbelow, the method of producing the preform will be described in more detail. In the method of producing the preform, multiple pieces of reinforcing fiber fabric bases, each of which comprises a reinforcing fiber fabric composed of reinforcing fiber strands and a binder comprising a thermosetting resin [A] and a curing catalyst [B] and applied at least on the surface of the reinforcing fiber fabric at an area coating weight of 0.1 to 4 g/m², are laminated, and then the resultant laminate is heated at a heating temperature T of 80 to 180° C. for a heating time t of 1 to 30 minutes to cure the binder such that the binder exhibits a lowest viscosity of 10 to 10,000 Pa·s and subsequently the viscosity of the binder increases to 10,000,000 Pa·s or more within the time t, thereby producing the preform.

If the preform is produced employing a temperature lower than 80° C. as the heating temperature T, curing of the binder becomes often insufficient and therefore it is difficult to achieve excellent bond strength. If a temperature higher than 180° C. is employed as the heating temperature T, the crosslinking density in a curing reaction product of the binder becomes high and therefore the bond strength of the binder is often deteriorated.

If the heating time t is shorter than 1 minute, it is likely that the curing of the binder becomes insufficient and therefore the bond strength in the preform becomes often insufficient. If the heating time t is longer than 30 minutes, the time of a preform molding cycle is prolonged, and therefore, productivity is decreased.

In the preform, since the area coating weight of the binder present between laminate layers is small, impregnability of the matrix resin is excellent and therefore a fiber-reinforced composite material formed from the preform can have excellent designability and mechanical properties.

The preform can have excellent demoldability and high dimensional precision even when the temperature during molding is maintained at a substantially constant temperature. When the temperature during molding is maintained at a substantially constant temperature, the time for increasing or decreasing the temperature of the preform mold is eliminated and therefore the time required for the molding of the preform can be greatly reduced. The term "a substantially constant temperature" generally refers to a temperature which varies within a range plus or minus 5° C.

A fiber-reinforced composite material can be produced by impregnating the preform with a liquid matrix resin and then curing the matrix resin. In general, curing the binder further proceeds with the progression of curing the matrix resin.

The method of producing the fiber-reinforced composite material is not particularly limited, and a molding method using a two-pack resin such as a hand lay-up method and an RTM method, can be employed suitably. Among these methods, an RTM method is particularly suitably employed, from the viewpoint of productivity and flexibility of the shape of a molded product. An RTM method is a method in which a liquid matrix resin is injected into a reinforcing fiber base placed in a molding mold to impregnate the reinforcing fiber base with the liquid matrix resin and the liquid matrix resin is cured to produce the fiber-reinforced composite material.

The liquid matrix resin comprises a liquid resin mainly composed of a monomer component and a curing agent or a curing catalyst which can crosslink the monomer component three-dimensionally to polymerize the monomer component.

As the matrix resin, an epoxy resin is preferred, from the viewpoint of the curing reactivity of the binder, the compatibility with the binder and the like.

Specific examples of the epoxy resin include an aromatic glycidyl ether produced from a phenol having multiple hydroxy groups, an aliphatic glycidyl ether produced from an alcohol having multiple hydroxy groups, a glycidylamine produced from an amine, a glycidyl ester produced from a carboxylic acid having multiple carboxyl groups, and an epoxy resin having an oxirane ring.

As the curing agent, an aliphatic polyamine, an aromatic polyamine, an acid anhydride, imidazole, a Lewis acid complex and the like are suitable. The curing agent to be used is selected appropriately depending on the intended use.

Curing by heating is carried out subsequent to injection of the matrix resin. The temperature of the molding mold to be employed at the curing by heating may be the same as a temperature of the molding mold employed at the injection of the matrix resin. However, if the curing is carried out at a low temperature, it often takes awhile to allow the curing to proceed until stiffness can be achieved to such an extent that the fiber-reinforced composite material is not deformed upon the demolding of the fiber-reinforced composite material. Therefore, it is preferred to select a temperature higher than the temperature of the molding mold employed at the injection, and the temperature preferably falls, for example, of 60 to 180° C.

To ensure that the fiber-reinforced composite material has high specific strength or a high specific elastic modulus, it is preferred that the fiber volume fraction Vf of the fiber-reinforced composite material is 40 to 85%, preferably 45 to 85%. The term "a fiber volume fraction Vf of a fiber-reinforced composite material" as used herein refers to a value defined and measured by the formula shown below in accordance with ASTM D3171 (1999), and is determined after the liquid matrix resin is injected into the reinforcing fiber fabric base and then the liquid matrix resin is cured. That is, the fiber volume fraction Vf of a fiber-reinforced composite material can be determined from a thickness h of the fiber-reinforced composite material in accordance with Formula (1) shown below:

$$\text{Fiber volume fraction Vf}(\%) = (Af \times N)/(\rho f \times h)/10 \quad (1)$$

Af: Mass of a reinforcing fiber fabric base per square meter (g/m$^2$)
N: Number of laminated reinforcing fiber fabric bases (pieces)
ρf: Density of reinforcing fibers (g/cm$^3$)
h: Thickness of a fiber-reinforced composite material (test specimen) (mm).

When the mass Af of the reinforcing fiber fabric base per square meter, the number N of laminated reinforcing fiber fabric bases or the density ρf of reinforcing fibers is unknown, the fiber volume fraction of the fiber-reinforced composite material is determined by any one method selected from a combustion method, a nitric acid decomposition method and a sulfuric acid decomposition method as specified in JIS K 7075:1991. In this case, the value of the density of the reinforcing fibers used should be a value determined in accordance with JIS R 7603:1999.

EXAMPLES

Hereinbelow, our substrates, preforms and composite materials will be described in more detail by way of examples.

1. Resin Ingredients

To produce the binders in the Examples, the resin ingredients mentioned below were used. Unless otherwise specified, the unit used to quantitatively express the constitutions of resin compositions in Tables 1 and 2 is "parts by mass."

Epoxy Resins
 "jER" (registered trademark) 806 (manufactured by Mitsubishi Chemical Corporation): a liquid bifunctional bisphenol F-type epoxy resin, epoxy equivalent: 165

"jER" (registered trademark) 1001 (manufactured by Mitsubishi Chemical Corporation): a solid bifunctional bisphenol A-type epoxy resin, epoxy equivalent: 475, glass transition temperature: 35° C.

"jER" (registered trademark) 1004 (manufactured by Mitsubishi Chemical Corporation): a solid bifunctional bisphenol A-type epoxy resin, epoxy equivalent: 975, glass transition temperature: 60° C.

"Sumiepoxy" (registered trademark) ELM434 (manufactured by Sumitomo Chemical Co., Ltd.): tetraglycidyl diamino diphenylmethane, epoxy equivalent: 120, a liquid form "EPICLON" (registered trademark) N-775 (manufactured by DIC Corporation): a solid phenol novolac-type epoxy resin, epoxy equivalent: 190, glass transition temperature: 45° C.

Benzoxazine Resins

A P-d-type benzoxazine resin (manufactured by Shikoku Chemicals Corporation): a solid P-d-type benzoxazine resin, molecular weight: 434, softening point: 75° C.

Thermoplastic Resins

"GRILAMID" (registered trademark) TR-55 (manufactured by EMS-CHEMIE (Japan) Ltd.): a polyamide Curing Agent "jERCURE" (registered trademark) DICY7 (manufactured by Mitsubishi Chemical Corporation): a finely milled dicyandiamide product (melting point: 210° C.)

Curing catalysts

"CUREZOL" (registered trademark) 2E4MZ (manufactured by Shikoku Chemicals Corporation): 2-ethyl-4methylimidazole "CUREZOL" (registered trademark) 1,2-DMZ (manufactured by Shikoku Chemicals Corporation): 1,2-dimethylimidazole "Fujicure" (registered trademark) FXR-1020 (manufactured by T&K TOKA CO., LTD.):

Modified Polyamines

"Omicure" (registered trademark) 24 (manufactured by PTI JAPAN LTD.): 2,4-tolylenebis(1,1-dimethylurea)

DY9577 (manufactured by Huntsman Advanced Materials): a boron trichloride octylamine complex 2. Carbon Fiber Fabrics A carbon fiber fabric produced by weaving PAN-type carbon fibers T700S-24K-50C (manufactured by Toray Industries, Inc.) has a plane weave structure and an area fiber density of 330 g/m$^2$ (fiber packing ratio: 0.54, fabric thickness: 0.34 mm, reinforcing fiber density: 1.80 g/cm$^3$)

A carbon fiber fabric produced by weaving PAN-type carbon fibers T300B-3K-40C (manufactured by Toray Industries, Inc.) has a plane weave structure and an area fiber density of 190 g/m$^2$ (fiber packing ratio: 0.40, fabric thickness: 0.27 mm, reinforcing fiber density: 1.76 g/cm$^3$)

A carbon fiber fabric produced by weaving PAN-type carbon fibers T700S-48K-50C (manufactured by Toray Industries, Inc.) has a plane weave structure and an area fiber density 640 g/m$^2$ (fiber packing ratio: 0.38, fabric thickness: 0.94 mm, reinforcing fiber density: 1.80 g/cm$^3$)

A carbon fiber fabric produced by weaving PAN-type carbon fibers T700S-24K-50C (manufactured by Toray Industries, Inc.) has a plane weave structure and an area fiber density of 280 g/m$^2$ (fiber packing ratio: 0.54, fabric thickness: 0.29 mm, reinforcing fiber density: 1.80 g/cm$^3$)

A carbon fiber fabric produced by weaving PAN-type carbon fibers T300B-6K-40C (manufactured by Toray Industries, Inc.) has a plane weave structure and an area fiber density of 317 g/m$^2$ (fiber packing ratio: 0.60, fabric thickness: 0.30 mm, reinforcing fiber density: 1.76 g/cm$^3$)

A carbon fiber fabric produced by weaving PAN-type carbon fibers T700S-12K-50C (manufactured by Toray Industries, Inc.) has a plane weave structure and an area fiber density of 480 g/m$^2$ (fiber packing ratio: 0.44, fabric thickness: 0.61 mm, reinforcing fiber density: 1.80 g/cm$^3$)

3. Preparation of Binders

The thermosetting resin, the thermoplastic resin, the curing agent and the curing catalyst, of which the raw materials and compounding ratios are shown in Tables 1 and 2, were mixed homogeneously by stirring while heating under temperature/time conditions under which a curing reaction did not proceed substantially, thereby preparing resin compositions. The resin compositions were used as binders.

4. Production of Binder Particles

Each of the resin compositions which were prepared as binders was frozen with liquid nitrogen and then crushed with a hammer mill (PULVERIZER, manufactured by Hosokawa Micron Corporation) and a screen having a pore size of 1 mm was used to produce particles. The particles were allowed to pass through sieves having mesh sizes of 45 μm, 75 μm, 150 μm, 212 μm and 300 μm, respectively, to produce binder particles having controlled particle diameters and a controlled particle diameter distribution index.

5. Measurement of Average Particle Diameter of Binder Particles

The measurement was carried out with a laser analysis/scattering-type particle diameter/particle size distribution analyzer MT330011 (manufactured by Nikkiso Co., Ltd.), wherein the number of captures was 500 times.

6. Measurement of Lowest Viscosity of Binder

The lowest viscosity of the above-produced binder particles was measured with a thermosetting measurement device ATD-1000 (manufactured by Alpha Technologies Inc.). The lowest viscosity was measured by setting about 5 g of the binder particles on the device and then heating the binder particles at a heating temperature shown in Table 1 or 2 under the conditions where a temperature rising rate of 5° C./min, a measurement frequency of 1 Hz and a measurement angle of 1%.

7. Measurement of Glass Transition Temperature of Binder

An intermediate point glass transition temperature was measured using the above-produced binder particles as a sample in accordance with JIS K 7121:1987 on a differential scanning calorimeter (DSC). As a measurement device, Pyris1 DSC (manufactured by Perkin Elmer Inc.) was used. A sample (5 to 10 mg) was collected in an aluminum-made sample pan and then subjected to the measurement under a nitrogen atmosphere at a temperature of −30 to 300° C. and at a temperature rising rate of 40° C./min. An intermediate point glass transition temperature in a part of a DSC curve in which a step-like change appeared in a heat-absorbing side was determined.

8. Production of Preform

The above-produced binder particles were sprayed onto one surface of a carbon fiber fabric at a spray amount shown in Table 1 or 2 and then the surface was heated with a far-infrared heater such that the reaction of the binder did not proceed, thereby producing a reinforcing fiber fabric base. The resultant reinforcing fiber fabric bases were laminated such that the directions of the front side and the back side of one of the bases became the same as those of the other, and then the resultant laminate was heated at a heating temperature of 80 to 180° C. for 1 to 30 minutes of the preform molding conditions shown in Table 1 or 2 while applying a pressure of 50 kPa, thereby producing a preform. In the preparation of a preform for use in the evaluation of bond strength, two pieces of the bases were laminated. In the preparation of a preform for use in the evaluation of matrix resin impregnability or the evaluation of the surface designability of a fiber-reinforced composite material produced from the preform, two, four or six pieces of the bases were laminated so that a molded product of the preform had a thickness of about 2 mm.

9. Evaluation of Bond Strength Between Layers in Preform

The preform for use in the evaluation of bond strength produced under the above-mentioned conditions was subjected to a delamination test between the reinforcing fiber fabric base layers. The test was carried out with "Instron" (registered trademark) universal testing machine (manufactured by Instron) in accordance with JIS K 6854-2:1977. The measurement was carried out while heating at the heating temperature at which the evaluation sample had been molded with a thermostatic bath. A test specimen was prepared by cutting the above-produced preform into a piece having a length of 150 mm (wherein a part positioned 100 mm from one end was bonded and a part positioned 50 mm from the other end was not bonded) and a width of 25 mm. The number of the test specimens used in the same test was 5, and an average value of the results obtained in the test specimens was employed as a test result. The pulling speed was 50 mm/min in the test.

10. Production of Fiber-Reinforced Composite Material

As the fiber-reinforced composite material for use in the evaluation of matrix resin impregnability or the evaluation of surface designability, a fiber-reinforced composite material produced by the above-mentioned RTM method was used. The above-produced preform was set on a metallic mold having a plate-like cavity with a size of 350 mm×700 mm×2 mm, and was then mold-clamped with a press device. Subsequently, the pressure of the inside of the metallic mold which was kept at 110° C. (molding temperature) was reduced to a pressure that was lower by 0.1 MPa than the atmospheric pressure with a vacuum pump, and a liquid matrix resin which had been warmed at 50° C. in advance was agitated and then injected into the metallic mold at a pressure of 0.2 MPa with a resin injector. Twelve minutes (i.e., a curing time) after initiation of the injection of the liquid matrix resin, the metallic mold was opened and the product demolded from the metallic mold to produce a fiber-reinforced composite material. As the liquid matrix resin, a liquid epoxy resin produced by mixing 100 parts by mass of "jER" (registered trademark) 828 (manufactured by Mitsubishi Chemical Corporation; a liquid bifunctional bisphenol A-type epoxy resin) which served as the main component with 3 parts by mass of "CUREZOL" (registered trademark) 2MZ (manufactured by Shikoku Chemicals Corporation; 2-methylimidazole) which served as a curing agent was used.

11. Evaluation of Impregnability of Preform with Matrix Resin

Impregnability during the resin injection process in the production of a fiber-reinforced composite material was comparatively evaluated in the following three grades. "Good": the void amount was less than 1% and therefore substantially no void was present in a molded product, "fair": although no resin-unimpregnated part was observed in the appearance of a molded product, the void amount in the molded product was 1% or more, and "bad": resin-unimpregnated parts were observed in the appearance of a molded product.

12. Evaluation of Designability of Surface of Fiber-Reinforced Composite Material The designability of the surface of a fiber-reinforced composite material was comparatively evaluated with naked eyes in the following three grades. "Good": when the brightness of the surface of a fiber-reinforced composite material and the uniformity (or irregularity) of light reflection on the surface of the fiber-reinforced composite material were determined by five examiners, all of the five examiners determined as good with respect to both of the items, "fair": four of the five examiners determined as good with respect to both of the items, and "bad": three or less of the five examiners determined as good with respect to both of the items. The evaluation was carried out by placing a fiber-reinforced composite material on a horizontal desk. With respect to the evaluation on brightness, unevenness of density was determined by observing the fiber-reinforced composite material from the Z-axis direction (i.e., a direction perpendicular to the surface of the fiber-reinforced composite material). With respect to the determination of light reflection, unevenness of reflection was determined by altering the angle of observation from the Z-axis direction to the Y-axis direction (i.e., directions of the axes of fibers in the fiber-reinforced composite material).

Examples 1 to 9, Reference Examples 1 to 2, Comparative Example 1

Lowest viscosities were determined in the above-mentioned manner using binder particles prepared in the above-mentioned manner in accordance with the compounding ratios shown in Table 1 employing the heating conditions shown in Table 1. Preforms for bond strength evaluation use and preforms for matrix resin impregnability evaluation use were prepared in the above-mentioned manner using reinforcing fiber fabric bases shown in Table 1 on which the above-mentioned binder particles were respectively sprayed, and employing the heating conditions shown in Table 1. Each of the produced preforms was subjected to the bond strength evaluation and the matrix resin impregnability evaluation. The surface quality evaluation of fiber-reinforced composite materials, which were molded for carrying out the liquid matrix resin impregnability evaluation in the above-mentioned manner, was also carried out.

In Example 1, as shown in Table 1, preforms and a fiber-reinforced composite material were produced using a base produced by combining binder particles comprising a solid bifunctional epoxy resin, a solid polyfunctional epoxy resin and an imidazole curing catalyst and had an average particle diameter of 120 μm and a particle diameter distribution index of 1.5, with a reinforcing fiber fabric composed of 24,000 filaments and had an area fiber density of 330 g/m$^2$ so that an area coating weight of the binder in the base became 1 g/m$^2$, and by carrying out the molding under the conditions where a heating temperature was 100° C. and the heating time was 10 minutes. The preform produced under the conditions had excellent bond strength and matrix resin impregnability, and a molded product of the preform had excellent surface designability.

In Example 2, as shown in Table 1, preforms and a fiber-reinforced composite material were produced under the same conditions as those employed in Example 1, except that only a solid polyfunctional epoxy resin was used as the thermosetting resin component constituting binder particles.

Subsequently, the preforms and the fiber-reinforced composite material were evaluated. Although the crosslinking density of the binder after the curing by heating was further increased and therefore the bond strength was decreased, the bond strength was sufficient and the matrix resin impregnability and the designability of the surface of a molded produce were also excellent.

In Example 3, as shown in Table 1, preforms and a fiber-reinforced composite material were produced under the conditions shown in Table 1, wherein only a solid bifunctional epoxy resin was used as the thermosetting resin component constituting binder particles. Subsequently, the preforms and the fiber-reinforced composite material were evaluated. Excellent bond strength was achieved in spite of a fact that the heating temperature was as low as 90° C., and the matrix resin impregnability and the designability of the surface of a molded product were also excellent.

In Example 4, as shown in Table 1, preforms and a fiber-reinforced composite material were produced under the conditions shown in Table 1, wherein 80 parts by mass of a solid bifunctional epoxy resin and 20 parts by mass of a solid polyfunctional epoxy resin were used as the thermosetting resin components constituting binder particles. Subsequently, the preforms and the fiber-reinforced composite material were evaluated. The bond strength of the binder after the curing by heating was excellent, and the matrix resin impregnability and designability of the surface of a molded product were also excellent.

In Example 5, as shown in Table 1, preforms and a fiber-reinforced composite material were produced under the conditions shown in Table 1, wherein 20 parts by mass of a solid bifunctional epoxy resin and 80 parts by mass of a solid polyfunctional epoxy resin were used as the thermosetting resin components constituting binder particles. Subsequently, the preforms and the fiber-reinforced composite material were evaluated. The bond strength of the binder after curing by heating was excellent, and the matrix resin impregnability and designability of the surface of a molded product were also excellent.

In Example 6, as shown in Table 1, preforms and a fiber-reinforced composite material were produced under the conditions shown in Table 1, wherein 20 parts by mass of a solid bifunctional epoxy resin and 80 parts by mass of a solid polyfunctional epoxy resin were used as the thermosetting resin components constituting binder particles and modified polyamine was added as the curing catalyst. Subsequently, the preforms and the fiber-reinforced composite material were evaluated. Sufficient heat resistance was achieved in spite of a fact that the heating temperature was as high as 140° C., the preform whose shape had been set was able to be demolded without decreasing the temperature of the preform mold, and sufficient bond strength was achieved.

In Example 7, as shown in Table 1, preforms and a fiber-reinforced composite material were produced under the conditions shown in Table 1, wherein dicyandiamide and 2,4-tolylenebis(1,1-dimethylurea) were respectively used as the curing agent and the curing catalyst constituting binder particles. Subsequently, the preforms and the fiber-reinforced composite material were evaluated. Although the heating time of 30 minutes at the heating temperature of 140° C. was needed because the curing system was altered, sufficient bond strength was achieved and the matrix resin impregnability and the designability of the surface of a molded product were also excellent.

In Example 8, as shown in Table 1, preforms and a fiber-reinforced composite material were produced under the conditions shown in Table 1, wherein a benzoxazine resin was used as the main component of the thermosetting resin constituting binder particles and a boron trichloride-octylamine complex was used as the curing catalyst. Subsequently, the preforms and the fiber-reinforced composite material were evaluated. Although the heating time of 10 minutes at the heating temperature of 150° C. was needed because the main component of the resin was altered, sufficient bond strength was achieved and the matrix resin impregnability and the designability of the surface of a molded product were also excellent.

In Example 9, as shown in Table 1, preforms and a fiber-reinforced composite material were produced under the conditions shown in Table 1, wherein 80 parts by mass of a solid bifunctional epoxy resin and 20 parts by mass of a liquid polyfunctional epoxy resin were used as the thermosetting resin constituting binder particles. Subsequently, the preforms and the fiber-reinforced composite material were evaluated. Sufficient bond strength was achieved, and the matrix resin impregnability and the designability of the surface of a molded product were excellent.

In Reference Example 1, as shown in Table 1, preforms and a fiber-reinforced composite material were produced using the same binder particles and the same reinforcing fiber fabric as those used in Example 4 under the conditions shown in Table 1 in which the heating temperature was 70° C. Subsequently, the preforms and the fiber-reinforced composite material were evaluated. The bond strength was insufficient, and designability of the surface of a molded product was poor.

In Reference Example 2, as shown in Table 1, preforms and a fiber-reinforced composite material were produced using the same binder particles and the reinforcing fiber fabric as those used in Example 4 under the conditions shown in Table 1 in which the heating temperature was 190° C. Subsequently, the preforms and the fiber-reinforced composite material were evaluated. The bond strength was insufficient, and designability of the surface of a molded product was poor.

In Comparative Example 1, as shown in Table 1, preforms and a fiber-reinforced composite material were produced under the same conditions as those employed in Example 1, except that the binder particles were composed of an epoxy resin and a thermoplastic resin. Subsequently, the preforms and the fiber-reinforced composite material were evaluated. Bond strength was insufficient, because the binder did not have curability and the lowest viscosity of the binder was high.

Examples 10 and 11, Comparative Examples 2 and 3

In Example 10, preforms and a fiber-reinforced composite material were produced in the same manner as in Example 1, except that the area coating weight of the binder was 0.3 g/m$^2$, and the preforms and the fiber-reinforced composite material were evaluated. The preforms produced under the conditions had excellent bond strength although the bond strength was slightly deteriorated, and the matrix resin impregnability and designability of the surface of a molded product were also excellent.

In Example 11, preforms and a fiber-reinforced composite material were produced in the same manner as in Example 1, except that the area coating weight of the binder was 4 g/m$^2$, and the preforms and the fiber-reinforced composite material were evaluated. The preforms produced under the conditions had excellent bond strength, and the matrix resin impregnability and designability of the surface of a molded product were also excellent.

In Comparative Example 2, preforms and a fiber-reinforced composite material were produced in the same manner as in Example 1, except that the area coating weight of the binder was 0.05 g/m², and the preforms and the fiber-reinforced composite material were evaluated. The preforms produced under the conditions had insufficient bond strength.

In Comparative Example 3, preforms and a fiber-reinforced composite material were produced in the same manner as in Example 1, except that the area coating weight of the binder was 5 g/m², and the preforms and the fiber-reinforced composite material were evaluated. Although the preforms produced under the conditions had excellent bond strength, impregnability of the liquid matrix resin was decreased and the quality of the surface of a molded product was poor.

Examples 12 to 14

In Examples 12 to 14, preforms and fiber-reinforced composite materials were produced in the same manner as in Example 1, except that binder particles prepared at the compounding ratios shown in Table 1 were used, and the preforms and the fiber-reinforced composite materials were evaluated.

In Example 12, the lowest viscosity of the binder resin was 10 Pa·s. In the preforms produced under these conditions, bond strength was excellent although the bond strength was slightly decreased, and the matrix resin impregnability and the designability of the surface of a molded product were also excellent.

In Example 13, the lowest viscosity of the binder resin was 10,000 Pa·s. In the preforms produced under these conditions, bond strength was excellent although the bond strength was slightly decreased, and the matrix resin impregnability and the designability of the surface of a molded product were also excellent.

In Example 14, the lowest viscosity of the binder resin was 3 Pa·s. In the preforms produced under these conditions, bond strength was sufficient although the bond strength was decreased, and the matrix resin impregnability and the designability of the surface of a molded product were quite good.

Examples 15 to 18

In Examples 15 to 18, preforms and fiber-reinforced composite materials were produced in the same manner as in Example 1, except that binder particles having average particle diameters of 0 μm, 50 μm, 300 μm and 500 μm were used, respectively, and the preforms and the fiber-reinforced composite material were evaluated. In the preforms produced under these conditions, bond strength was excellent although the bond strength was slightly decreased, and the matrix resin impregnability was also excellent. However, when the average particle diameter was 500 μm, designability of the surface of a fiber-reinforced composite material was slightly deteriorated.

Example 19

In Example 19, preforms and a fiber-reinforced composite material were produced in the same manner as in Example 1, except that particles having an average particle diameter of 300 μm, having a particle diameter distribution index of 2.1 and therefore having a high dispersion degree were used, and the preforms and the fiber-reinforced composite material were evaluated. In the preforms produced under these conditions, bond strength was sufficient although the bond strength was slightly decreased. However, designability of the surface of a fiber-reinforced composite material was deteriorated, because particles having large particle diameters were contained.

Examples 20 to 24

In Examples 20 to 22, preforms and fiber-reinforced composite materials were produced in the same manner as in Example 1, except that the type of the reinforcing fiber fabric base was changed within the range in which the above-mentioned formula (1) is satisfied, and the preforms and the fiber-reinforced composite materials were evaluated. In the preforms produced under these conditions, excellent bond strength was achieved. Among the preforms, one having a larger number of filaments had higher bond strength because delamination was likely to be caused by the slippage of fibers in the reinforcing fiber fabric.

In Examples 23 and 24, preforms and fiber-reinforced composite materials were produced in the same manner as in Example 1, except that a reinforcing fiber fabric base having a low flattened level, i.e., having a "W−0.11n" value greater than 160 in the above-mentioned formula (1), was used, and the preforms and the fiber-reinforced composite materials were evaluated. In the preforms produced under these conditions, bond strength was sufficient, although the bond strength was decreased compared with that of preforms produced using a reinforcing fiber fabric base having a higher flattened level. Impregnability was slightly deteriorated.

TABLE 1

| | | | Example 1 | Example 2 | Example 3 | Example 4 | Example 5 | Example 6 | Example 7 | Example 8 | Example 9 | Reference Example 1 | Reference Example 2 |
|---|---|---|---|---|---|---|---|---|---|---|---|---|---|
| Thermo setting resins | Liquid bifunctional epoxy resin | Bisphenol F-type epoxy resin | jER806 | 50 | — | — | — | — | — | — | — | — | — | — |
| | Solid bifunctional epoxy resin | Bisphenol A-type epoxy resin | jER1001 | — | 100 | — | — | — | — | — | — | — | — | — |
| | Solid bifunctional epoxy resin | Bisphenol A-type epoxy resin | jER1004 | — | — | 80 | 80 | 20 | 20 | 50 | 20 | 80 | 80 | 80 |
| | Liquid polyfunctional epoxy resin | Glycidylamine-type | ELM434 | — | — | — | — | — | — | 50 | — | 20 | — | — |
| | Solid polyfunctional epoxy resin | Phenol novolac-type epoxy resin | N-775 | 50 | 100 | 20 | 20 | 80 | 80 | — | — | — | 20 | 20 |
| | P-d-type benzoxazine resin | | P-d | — | — | — | — | — | — | — | 80 | — | — | — |
| Thermo plastic resin | Grilamid | | TR-55 | — | — | — | — | — | — | — | — | — | — | — |
| Curing agent | Dicyandiamide | | DICY7 | 10 | 10 | 10 | 10 | 10 | 10 | — | — | 10 | 10 | 10 |
| Curing catalyst | 2-ethyl-4-methylimidazole | | 2E4MZ | — | — | — | — | — | — | 4 | — | — | — | — |
| | 1,2-dimethylimidazole | | 1,2-DMZ | — | — | — | — | — | — | — | — | — | — | — |
| | Modified aliphatic polyamine | | FXR-1020 | — | — | — | — | — | — | — | — | — | — | — |
| | 2,4-tolylenebis(1,1-dimethylurea) | | Omicure 24 | — | — | — | — | — | — | 5 | — | — | — | — |
| | Boron trichloride-octylamine complex | | DY9577 | — | — | — | — | — | — | — | 10 | — | — | — |
| Fabric bases | Number of filaments n | | | 24000 | 24000 | 24000 | 24000 | 24000 | 24000 | 24000 | 24000 | 24000 | 24000 | 24000 |
| | Area fiber density W [g/m²] | | | 330 | 330 | 330 | 330 | 330 | 330 | 330 | 330 | 330 | 330 | 330 |
| | W-0.011n (flattened level) | | | 66 | 66 | 66 | 66 | 66 | 66 | 66 | 66 | 66 | 66 | 66 |
| Binder Particles | Average particle diameter [μm] | | | 120 | 120 | 120 | 120 | 120 | 120 | 120 | 120 | 120 | 120 | 120 |
| | Particle diameter distribution index [—] | | | 1.5 | 1.5 | 1.4 | 1.5 | 1.5 | 1.5 | 1.5 | 1.8 | 1.4 | 1.5 | 1.5 |
| | Glass transition temperature [°C] | | | 52 | 42 | 61 | 58 | 47 | 48 | 54 | 49 | 40 | 58 | 58 |
| | Area coating weight of binder [g/m²] | | | 1 | 1 | 1 | 1 | 1 | 1 | 1 | 1 | 1 | 1 | 1 |
| Preform | Heating temperature [°C] | | | 100 | 100 | 90 | 100 | 100 | 140 | 140 | 150 | 100 | 70 | 190 |
| | heating time [min] | | | 10 | 10 | 28 | 14 | 11 | 5 | 30 | 10 | 14 | 30 | 1 |
| | Lowest viscosity [Pa·s] | | | 300 | 200 | 1,000 | 500 | 300 | 10 | 10 | 30 | 10 | 20,000 | 10 |
| | Post-curing viscosity [Pa·s] | | | $1.1 \times 10^7$ | $1.1 \times 10^7$ | $1.1 \times 10^7$ | $1.1 \times 10^7$ | $1.1 \times 10^7$ | $1.1 \times 10^7$ | $1.1 \times 10^7$ | $1.1 \times 10^7$ | $1.1 \times 10^7$ | 300,000 | 1,000,000 |
| Properties | Bond strength [N/25 mm] | | | 1.3 | 1.1 | 1.4 | 1.4 | 1.3 | 1.1 | 1.1 | 1 | 1.1 | 0.2 | 0.2 |
| | Matrix resin impregnability | | | good | good | good | good | good | good | good | good | good | Fair | fair |
| | Designability of composite material | | | good | good | good | good | good | good | good | good | good | Bad | bad |

TABLE 1-continued

| | | | | Comparative Example 1 | Example 10 | Example 11 | Comparative Example 2 | Comparative Example 3 | Example 12 | Example 13 | Example 14 |
|---|---|---|---|---|---|---|---|---|---|---|---|
| Thermo setting resins | Liquid bifunctional epoxy resin | Bisphenol F-type epoxy resin | jER806 | 20 | — | — | — | — | — | — | — |
| | Solid bifunctional epoxy resin | Bisphenol A-type epoxy resin | jER1001 | 20 | — | — | — | — | — | — | 50 |
| | Solid bifunctional epoxy resin | Bisphenol A-type epoxy resin | jER1004 | — | 50 | 50 | 50 | 50 | 30 | 50 | — |
| | Liquid polyfunctional epoxy resin | Glycidylamine-type epoxy resin | ELM434 | — | — | — | — | — | 20 | — | — |
| | Solid polyfunctional epoxy resin | Phenol novolac-type epoxy resin | N-775 | — | 50 | 50 | 50 | 50 | 50 | 50 | 50 |
| | P-d-type benzoxazine resin | | P-d | 60 | — | — | — | — | — | — | — |
| Thermo plastic resin | Grilamid | | TR-55 | — | — | — | — | — | — | — | — |
| Curing agent | Dicyandiamide | | DICY7 | — | — | — | — | — | — | — | — |
| Curing catalyst | 2-ethyl-4methylimidazole | | 2E4MZ | — | 10 | 10 | 10 | 10 | 10 | — | 10 |
| | 1,2-dimethylimidazole | | 1,2-DMZ | — | — | — | — | — | — | 5 | — |
| | Modified aliphatic polyamine | | FXR-1020 | — | — | — | — | — | — | — | — |
| | 2,4-tolylenebis(1,1-dimethylurea) | | Omicure 24 | — | — | — | — | — | — | — | — |
| | Boron trichloride-octylamine complex | | DY9577 | — | — | — | — | — | — | — | — |
| Fabric bases | Number of filaments n | | | 24000 | 24000 | 24000 | 24000 | 24000 | 24000 | 24000 | 24000 |
| | Area fiber density W [g/m²] | | | 330 | 330 | 330 | 330 | 330 | 330 | 330 | 330 |
| | W-0.011n (flattened level) | | | 66 | 66 | 66 | 66 | 66 | 66 | 66 | 66 |
| Binder Particles | Average particle diameter [μm] | | | 140 | 120 | 120 | 120 | 120 | 120 | 120 | 120 |
| | Particle diameter distribution index [—] | | | 1.3 | 1.5 | 1.5 | 1.5 | 1.5 | 1.5 | 1.5 | 1.5 |
| | Glass transition temperature [°C] | | | 80 | 52 | 52 | 52 | 52 | 45 | 53 | 37 |
| | Area coating weight of binder [g/m²] | | | 1 | 0.3 | 4 | 0.05 | 5 | 1 | 1 | 1 |
| Preform | Heating temperature [°C] | | | 100 | 100 | 100 | 100 | 100 | 100 | 100 | 100 |
| | Heating time [min] | | | 10 | 10 | 10 | 10 | 10 | 10 | 7 | 10 |
| Properties | Lowest viscosity [Pa · s] | | | 25,000 | 300 | 300 | 300 | 300 | 10 | 10,000 | 3 |
| | Post-curing viscosity [Pa · s] | | | 25,000 | 1.1 × 10⁷ | 1.1 × 10⁷ | 1.1 × 10⁷ | 1.1 × 10⁷ | 1.1 × 10⁷ | 1.1 × 10⁷ | 1.1 × 10⁷ |
| | Bond strength [N/25 mm] | | | 0.2 | 0.9 | 1.7 | 0.4 | 1.8 | 1 | 0.9 | 0.8 |
| | Matrix resin impregnability | | | fair | good | good | fair | bad | good | good | fair |
| | Designability of composite material | | | bad | good | good | bad | fair | good | good | good |

TABLE 2

|  |  |  | Example 15 | Example 16 | Example 17 | Example 18 | Example 19 |
|---|---|---|---|---|---|---|---|
| Thermosetting resins | Liquid bifunctionall epoxy resin | Bisphenol F-type epoxy resin | jER806 | — | — | — | — | — |
|  | Solid bifunctional epoxy resin | Bisphenol A-type epoxy resin | jER1001 | — | — | — | — | — |
|  | Solid bifunctionall epoxy resin | Bisphenol A-type epoxy resin | jER1004 | 50 | 50 | 50 | 50 | 50 |
|  | Liquid polyfunctional epoxy resin | Glycidylamine-type epoxy resin | ELM434 | — | — | — | — | — |
|  | Solid polyfunctional epoxy resin | Phenol novolac-type epoxy resin | N-775 | 50 | 50 | 50 | 50 | 50 |
|  | P-d-type benzoxazine resin |  | P-d | — | — | — | — | — |
| Thermoplastic resin | Grilamid |  | TR-55 | — | — | — | — | — |
| Curing agent | Dicyandiamide |  | DICY7 | — | — | — | — | — |
| Curing catalysts | 2-ethyl-4methylimidazole |  | 2E4MZ | 10 | 10 | 10 | 10 | 10 |
|  | 1,2-dimethylimidazole |  | 1,2-DMZ | — | — | — | — | — |
|  | Modified aliphatic polyamine |  | FXR-1020 | — | — | — | — | — |
|  | 2,4-tolylenebis(1,1-dimethylurea) |  | Omicure 24 | — | — | — | — | — |
|  | Boron trichloride-octylamine complex |  | DY9577 | — | — | — | — | — |
| Fabric bases | Number of filaments n |  |  | 24000 | 24000 | 24000 | 24000 | 24000 |
|  | Area fiber density W [g/m²] |  |  | 330 | 330 | 330 | 330 | 330 |
|  | W-0.011n (flattened level) |  |  | 66 | 66 | 66 | 66 | 66 |
| Binder particles | Average particle diameter [μm] |  |  | 30 | 50 | 300 | 500 | 300 |
|  | Particle diameter distribution index [—] |  |  | 1.5 | 1.5 | 1.2 | 1.3 | 2.1 |
|  | Glass transition temperature [° C.] |  |  | 52 | 52 | 52 | 52 | 52 |
|  | Area coating weight of binder [g/m²] |  |  | 1 | 1 | 1 | 1 | 1 |
| Preforms | Heating temperature [° C.] |  |  | 100 | 100 | 100 | 100 | 100 |
|  | Heating time [min] |  |  | 10 | 10 | 10 | 10 | 10 |
|  | Lowest viscosity [Pa · s] |  |  | 300 | 300 | 300 | 300 | 300 |
|  | Post-curing viscosity [Pa · s] |  |  | $1.1 \times 10^7$ | $1.1 \times 10^7$ | $1.1 \times 10^7$ | $1.1 \times 10^7$ | $1.1 \times 10^7$ |
| Properties | Bond strength [N/25 mm] |  |  | 0.8 | 1.1 | 1.1 | 0.8 | 0.6 |
|  | Matrix resin impregnability |  |  | good | good | Good | good | good |
|  | Designability of composite material |  |  | good | good | Good | fair | fair |

|  |  |  | Example 20 | Example 21 | Example 22 | Example 23 | Example 24 |
|---|---|---|---|---|---|---|---|
| Thermosetting resins | Liquid bifunctionall epoxy resin | Bisphenol F-type epoxy resin | jER806 | — | — | — | — | — |
|  | Solid bifunctional epoxy resin | Bisphenol A-type epoxy resin | jER1001 | — | — | — | — | — |
|  | Solid bifunctionall epoxy resin | Bisphenol A-type epoxy resin | jER1004 | 50 | 50 | 50 | 50 | 50 |
|  | Liquid polyfunctional epoxy resin | Glycidylamine-type epoxy resin | ELM434 | — | — | — | — | — |
|  | Solid polyfunctional epoxy resin | Phenol novolac-type epoxy resin | N-775 | 50 | 50 | 50 | 50 | 50 |
|  | P-d-type benzoxazine resin |  | P-d | — | — | — | — | — |
| Thermoplastic resin | Grilamid |  | TR-55 | — | — | — | — | — |
| Curing agent | Dicyandiamide |  | DICY7 | — | — | — | — | — |
| Curing catalysts | 2-ethyl-4methylimidazole |  | 2E4MZ | 10 | 10 | 10 | 10 | 10 |
|  | 1,2-dimethylimidazole |  | 1,2-DMZ | — | — | — | — | — |
|  | Modified aliphatic polyamine |  | FXR-1020 | — | — | — | — | — |
|  | 2,4-tolylenebis(1,1-dimethylurea) |  | Omicure 24 | — | — | — | — | — |
|  | Boron trichloride-octylamine complex |  | DY9577 | — | — | — | — | — |
| Fabric bases | Number of filaments n |  |  | 3000 | 48000 | 24000 | 6000 | 12000 |
|  | Area fiber density W [g/m²] |  |  | 190 | 640 | 280 | 317 | 480 |
|  | W-0.011n (flattened level) |  |  | 157 | 112 | 16 | 310 | 348 |
| Binder particles | Average particle diameter [μm] |  |  | 120 | 120 | 120 | 120 | 120 |
|  | Particle diameter distribution index [—] |  |  | 1.5 | 1.5 | 1.5 | 1.5 | 1.5 |
|  | Glass transition temperature [° C.] |  |  | 52 | 52 | 52 | 52 | 52 |
|  | Area coating weight of binder [g/m²] |  |  | 1 | 1 | 1 | 1 | 1 |
| Preforms | Heating temperature [° C.] |  |  | 100 | 100 | 100 | 100 | 100 |
|  | Heating time [min] |  |  | 10 | 10 | 10 | 10 | 10 |
|  | Lowest viscosity [Pa · s] |  |  | 300 | 300 | 300 | 300 | 300 |
|  | Post-curing viscosity [Pa · s] |  |  | $1.1 \times 10^7$ | $1.1 \times 10^7$ | $1.1 \times 10^7$ | $1.1 \times 10^7$ | $1.1 \times 10^7$ |
| Properties | Bond strength [N/25 mm] |  |  | 1.2 | 1.5 | 1.3 | 0.8 | 0.8 |
|  | Matrix resin impregnability |  |  | fair | good | good | fair | fair |
|  | Designability of composite material |  |  | good | good | good | good | good |

The invention claimed is:

1. A reinforcing fiber fabric base comprising:
a reinforcing fiber fabric composed of reinforcing fiber strands; and
a binder having a glass transition temperature of 40 to 80° C. comprising a thermosetting resin [A] and a curing catalyst [B], and applied at least on the surface of the reinforcing fiber fabric at an area coating weight of 0.1 to 4 g/m², wherein the reinforcing fiber fabric base has such a property that a heating temperature T at which the bond strength between layers in a preform, which is produced by laminating the reinforcing fiber fabric bases and then molding the resultant laminate at the heating temperature T, is 0.5 N/25 mm or more at 80 to 180° C.

2. The reinforcing fiber fabric base according to claim 1, wherein the thermosetting resin [A] contains a bifunctional epoxy resin.

3. The reinforcing fiber fabric base according to claim 2, wherein the bifunctional epoxy resin is a solid bifunctional epoxy resin and the thermosetting resin [A] additionally contains a polyfunctional epoxy resin.

4. The reinforcing fiber fabric base according to claim 3, wherein the solid bifunctional epoxy resin and the polyfunctional epoxy resin are contained in amounts of 20 to 80 parts by mass and 20 to 80 parts by mass, respectively, in 100 parts by mass of the thermosetting resin [A].

5. The reinforcing fiber fabric base according to claim 3, wherein the polyfunctional epoxy resin is a solid polyfunctional epoxy resin.

6. The reinforcing fiber fabric base according to claim 2, wherein the bifunctional epoxy resin is a bisphenol epoxy resin.

7. The reinforcing fiber fabric base according to claim 3, wherein the polyfunctional epoxy resin is a non-glycidylamine epoxy resin.

8. The reinforcing fiber fabric base according to claim 1, wherein the curing catalyst [B] is at least one curing catalyst selected from an organic phosphorous compound, imidazole or a derivative thereof the aforementioned compounds.

9. The reinforcing fiber fabric base according to claim 1, wherein the binder has a property such that, when the binder is heated at a heating temperature T of 80 to 180° C. for a heating time t of 1 to 30 minutes, a combination of the heating temperature T and the heating time t causes curing of the binder such that the binder has a lowest viscosity of 10 to 10,000 Pa·s and, subsequently, viscosity of the binder increases to 10,000,000 Pa·s or more within the time t.

10. The reinforcing fiber fabric base according to claim 1, wherein the bond strength obtained when the area coating weight of the binder is 1 g/m$^2$ is 60% or more of that obtained when the area coating weight of the binder is 4 g/m$^2$.

11. The reinforcing fiber fabric base according to claim 1, wherein the binder is in a particulate form.

12. The reinforcing fiber fabric base according to claim 11, wherein the binder has an average particle diameter of 50 to 300 μm.

13. The reinforcing fiber fabric base according to claim 11, wherein a particle diameter distribution index of the average particle diameter of the binder is 1 to 1.8.

14. The reinforcing fiber fabric base according to claim 1, wherein a number n of filaments in reinforcing fiber strands that constitute the reinforcing fiber fabric and an area fiber density W[g/m$^2$] of the reinforcing fiber fabric satisfies Formula (1):

$$0 \leq W - 0.011n \leq 160 \tag{1}$$

15. The reinforcing fiber fabric base according to claim 1, wherein a number n of filaments in the reinforcing fiber strands that constitute the reinforcing fiber fabric and an area fiber density W[g/m$^2$] of the reinforcing fiber fabric satisfies Formula (2):

$$0 \leq W - 0.011n \leq 140 \tag{2}$$

16. The reinforcing fiber fabric base according to claim 1, wherein the reinforcing fiber strands are carbon fiber strands.

17. A resin composition used as a binder in a reinforcing fiber fabric base as recited in claim 1.

18. A preform produced by laminating multiple pieces of reinforcing fiber fabric bases as recited in claim 1 and then setting the shape of the resultant laminate.

19. A fiber-reinforced composite material produced by impregnating a preform as recited in claim 18 with a liquid thermosetting resin and then curing the resultant product.

20. A method of producing a preform comprising:
laminating multiple pieces of reinforcing fiber fabric bases each of which comprises a reinforcing fiber fabric composed of reinforcing fiber strands and a binder having a glass transition temperature of 40 to 80° C. comprising a thermosetting resin [A] and a curing catalyst [B], and applied at least on the surface of the reinforcing fiber fabric at an area coating weight of 0.1 to 4 g/m$^2$; and
heating the resultant laminate at a heating temperature T of 80 to 180° C. for a heating time t of 1 to 30 minutes to cure the binder such that the binder has a lowest viscosity of 10 to 10,000 Pa·s and, subsequently, viscosity of the binder increases to 10,000,000 Pa·s or more within the time t, thereby producing the preform.

21. A reinforcing fiber fabric base consisting of:
a reinforcing fiber fabric composed of reinforcing fiber strands; and
a binder having a glass transition temperature of 40 to 80° C. comprising a thermosetting resin [A] and a curing catalyst [B], and is applied at least on the surface of the reinforcing fiber fabric at an area coating weight of 0.1 to 4 g/m$^2$, wherein the reinforcing fiber fabric base has such a property that a heating temperature T at which the bond strength between layers in a preform, which is produced by laminating the reinforcing fiber fabric bases and then molding the resultant laminate at the heating temperature T, is 0.5 N/25 mm or more at 80 to 180° C.

22. A method of producing a preform, comprising:
laminating multiple pieces of reinforcing fiber fabric bases each of which consisting of a reinforcing fiber fabric composed of reinforcing fiber strands and a binder having a glass transition temperature of 40 to 80° C. comprising a thermosetting resin [A] and a curing catalyst [B], and applied at least on the surface of the reinforcing fiber fabric at an area coating weight of 0.1 to 4 g/m$^2$; and
heating the resultant laminate at a heating temperature T of 80 to 180° C. for a heating time t of 1 to 30 minutes to cure the binder such that the binder has a lowest viscosity of 10 to 10,000 Pa·s and, subsequently, viscosity of the binder increases to 10,000,000 Pa·s or more within the time t, thereby producing the preform.

* * * * *